Jan. 5, 1971  W. R. GLASSON ET AL  3,552,223
LIQUID LUBRICATED EXPANSIBLE V-PULLEY SYSTEM
Filed Jan. 6, 1969  3 Sheets-Sheet 1

INVENTORS
WOODROW R. GLASSON
GLEN MALCOM
GEORGE M. LAMBERT
JACKIE W. SHUMAKER
BY Hood, Gust, Irish & Lundy
ATTORNEYS

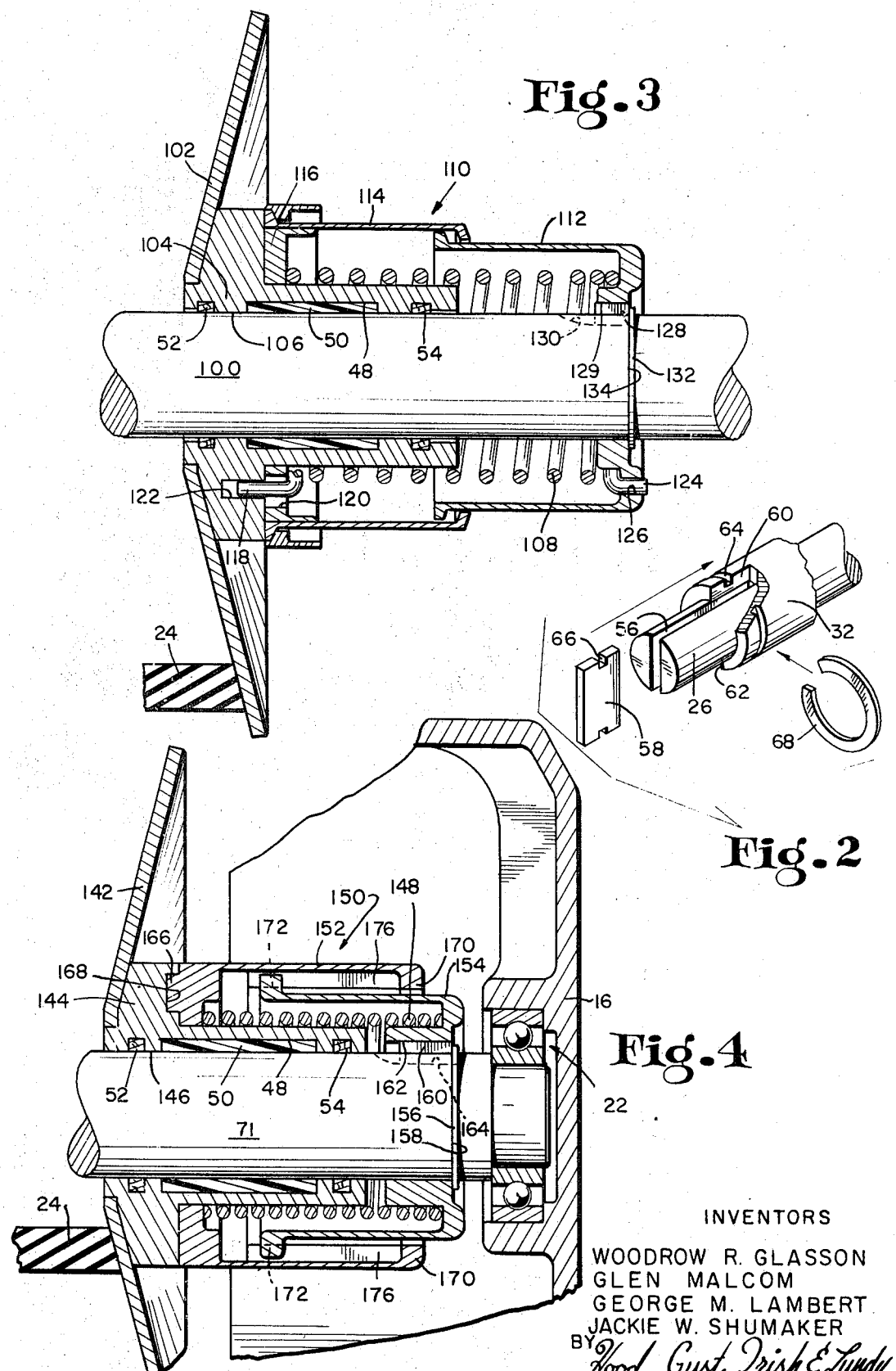

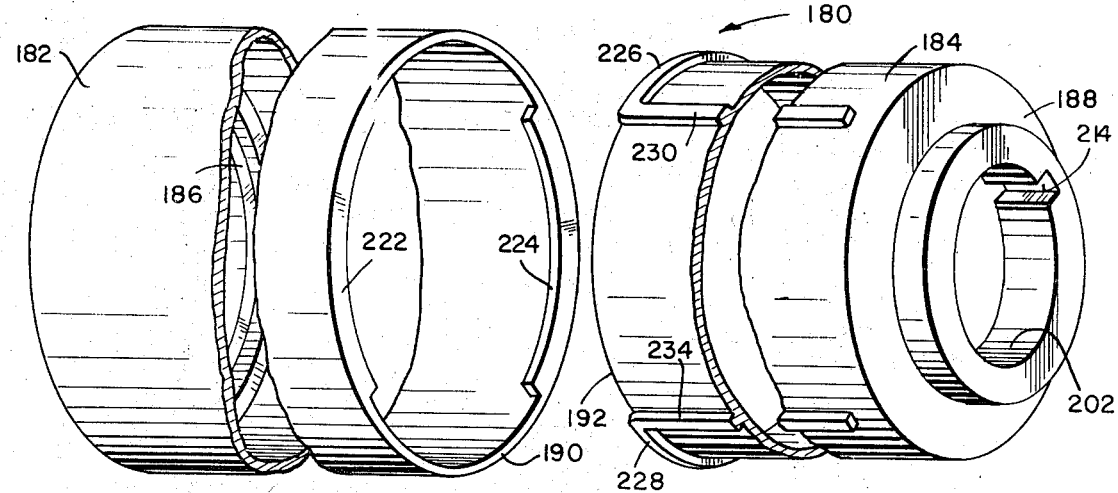
Fig. 5
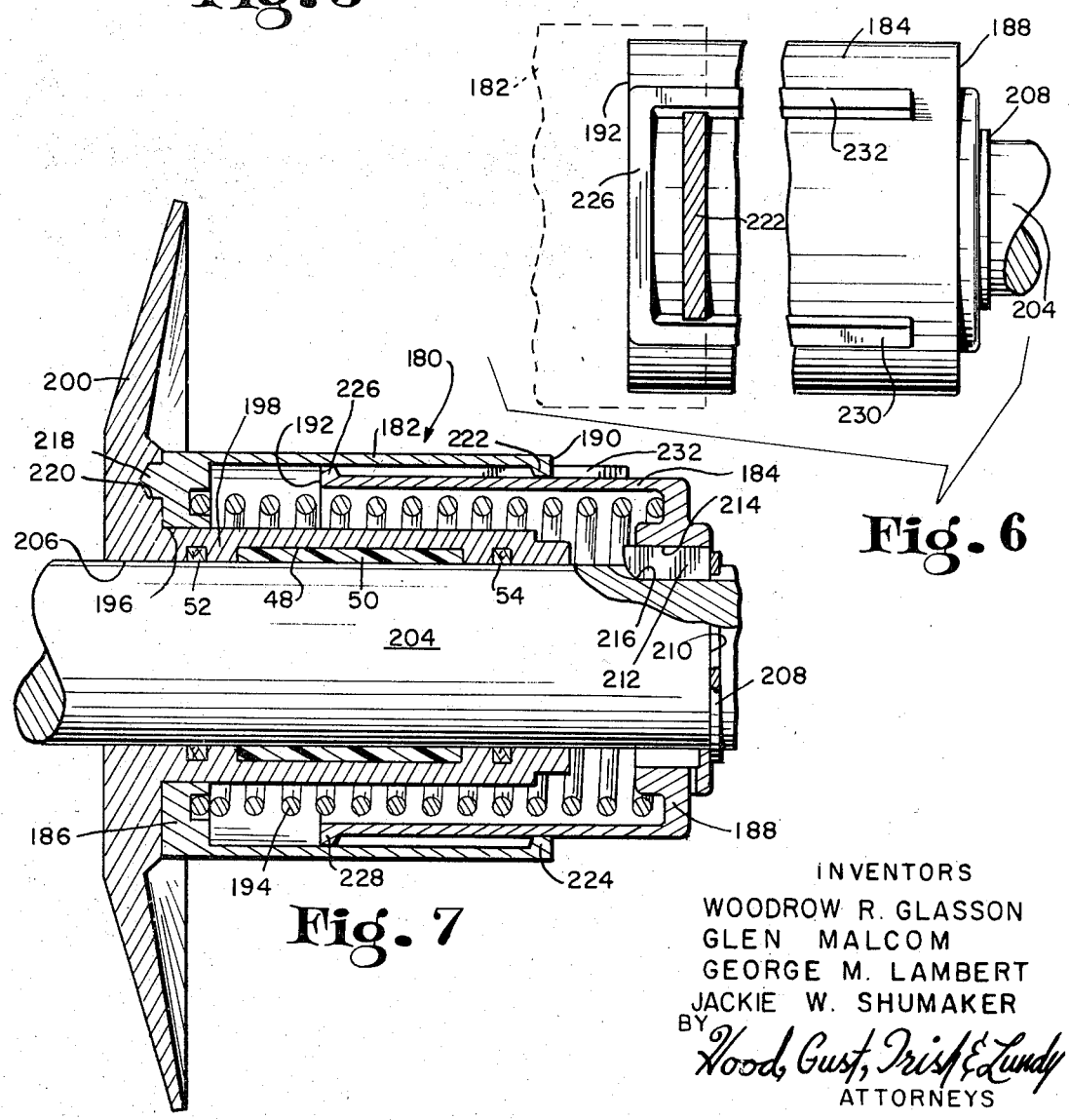
Fig. 6
Fig. 7

United States Patent Office 3,552,223
Patented Jan. 5, 1971

3,552,223
LIQUID-LUBRICATED EXPANSIBLE V-PULLEY SYSTEM
Woodrow R. Glasson, Glen A. Malcom, George M. Lambert, and Jackie W. Shumaker, Columbus, Ind., assignors to The Reliance Electric and Engineering Company, Cleveland, Ohio, a corporation of Ohio
Filed Jan. 6, 1969, Ser. No. 789,312
Int. Cl. F16h 55/56
U.S. Cl. 74—230.17
15 Claims

ABSTRACT OF THE DISCLOSURE

A resiliently-expansible V-pulley comprising a hub, a coned disc axially movable on the hub, the coned disc having an axial bore for telescopically receiving the hub, the bore being formed with a peripherally and axially extending cutout intermediate its ends and providing a reservoir. Means providing a seal between the disc and the hub at each end of the reservoir are provided and porous means disposed in and substantially filling the reservoir is provided, the porous means being impregnated by liquid lubricant. The lubricant, which is fed to the outer surface of the hub by the porous means, serves to prevent fretting corrosion. Means for preventing relative rotation between the disc and the hub is provided, which means does not penetrate the reservoir. In one embodiment of the invention, this means includes a key carried by the sleeve portion of the disc so that, in its axially innermost position, the key is axially outwardly from the reservoir; in another embodiment, the conventional coiled compression spring which urges the disc axially inwardly provides a driving connection between the disc and the hub, one end of the spring being connected to the disc and the opposite end of the spring being connected to the hub; and in a further embodiment, the driving connection between the disc and the hub is provided through the cartridge which contains the compression spring.

---

It is a primary object of our invention to provide a liquid-lubricated, expansible V-pulley system which is simple in structure, but yet effective for the purpose intended.

Expansible V-pulleys of the type with which our invention is concerned comprise a pair of coned discs disposed on a hub, at least one of the discs being axially movable on the hub, and a coiled compression spring for yieldably urging the movable disc toward its mating disc. Conventionally, the movable coned disc has an axial bore for telescopically receiving the hub, the hub and bore being provided with axially extending and registering keyways which receive a key for drivingly connecting the disc to the hub. The key and keyway arrangement permits axial movement of the disc relative to the hub. The problem of fretting corrosion, i.e., a form of wear resulting from oscillating or vibratory motion of limited amplitude, has long plagued manufacturers of variable speed pulley systems. Specifically, the axial oscillation of the movable disc on the hub tends to produce fretting corrosion between the outer peripheral surface of the hub and the inner peripheral surface of the bore of the disc. It has been found that low viscosity oils minimize fretting corrosion. Thus, it is highly desirable to feed constantly a film of such oil to the wear surfaces of a movable disc and hub.

In the past, several attempts have been made to provide expansible V-pulley systems with built-in oil reservoirs. To our knowledge, each attempt has resulted in complicated and, therefore, undesirable structures arranged to contain the liquid lubricant.

It will be appreciated that one of the problems involved in containing a liquid lubricant in a V-pulley system is the fact that the pulley may be rotated at extremely high speeds and that the centrifugal force involved in such rotation will tend to cause the liquid to move past, for instance, conventional O-ring seals. As is well known in the V-pulley art, undesirable consequences will result if significant quantities of lubricant are deposited on the belt-engaging conical surfaces of the discs.

Another problem with conventional liquid-lubricated V-pulley systems is that, when the systems are disassembled, it is difficult to keep the lubricant from spilling.

Still another problem with conventional liquid-lubricated V-pulley systems is that, when a conventional key is provided to prevent rotation of the disc relative to the hub, it is difficult to provide a liquid seal in the area of the key.

We have found that the problem of fretting corrosion between the outer surface of the hub and the inner surface of the bore of the coned disc can best be solved by providing a rather radially shallow reservoir in the bore and then filling the reservoir with porous means, such as polyurethane foam material which is impregnated with a suitable liquid lubricant so that, when the hub is inserted into the bore, the foam material bears against the outer surface of the hub continually to wipe or deposit the liquid lubricant thereon. Preferably, we provide a peripherally and axially extending cutout intermediate the ends of the bore, this cutout providing the reservoir. Also, preferably, the porous means is a sleeve-like member which substantially fills the peripherally and axially extending cutout. Further, preferably, means providing a seal between the disc and the hub is disposed at each end of the reservoir, i.e., each end of the cutout, each such means may include, for instance, a felt ring disposed in a peripheral groove formed in the bore.

An object of our invention, therefore, is to provide a V-pulley comprising a hub, a coned disc axially movable on the hub, the coned disc having an axial bore formed with a peripherally and axially extending cutout intermediate its ends and providing a reservoir, means providing a seal between the disc and the hub at each end of the reservoir, porous means disposed in and substantially filling the reservoir, and liquid lubricant impregnating the porous means. An advantageous feature of our reservoir arrangement is that the V-pulley assembly can be disassembled without spilling significant quantities of lubricant. That is, the porous means, which preferably is a foamlike sleeve, holds the liquid lubricant in its pores so that, when the disc and hub are separated, the lubricant stays in the sleeve. If the porous means is not provided, lubricant will spill uncontrollably as soon as the disc and hub are separated.

Another object of our invention is to provide such a V-pulley in which the axially outer end of the hub is provided with an axially extending slot, the axially inner end of which terminates at a point axially outwardly of the outermost means providing a seal and in which the sleeve portion of the disc carries a key arranged to extend into the slot to prevent relative rotation between the disc and the hub. In the illustrative embodiment, the sleeve portion of the disc is provided with diametrically oppositely disposed keyways registering, respectively, with the radial edges of the slot in the hub and the key extends diametrically through the slot to have its ends received, respectively, in the keyways. Further, in the illustrative embodiment, the key is connected to the sleeve portion for movement therewith relative to the hub. Further, we prefer that the key be an aluminum key provided with a tetrafluoroethylene-penetrated anodize coating. This anodize coating reduces fretting corrosion between the key and the walls of the slot.

Still another object of our invention is to provide such a V-pulley including a coiled spring for yieldably urging the disc in one direction along the hub, the spring being disposed generally concentrically about the hub with one end of the spring connected to the disc and the opposite end of the spring connected to the hub, whereby the spring, itself, is effective to prevent significant rotation of the disc relative to the hub.

A further object of our invention is to provide an axially expansible cartridge for containing the spring which urges a disc axially along a hub, the cartridge including a pair of telescopically related tubular means generally concentrically disposed about the hub, one of the tubular means being connected to the hub for rotation therewith and the other of the tubular means being connected to the disc for rotation therewith, one of the tubular means providing an axially extending keyway for receiving and guiding a lip segment formed on the other tubular means.

Other objects and features of the present invention will become apparent as this description progresses.

To the accomplishment of the above and related objects, our invention may be embodied in the forms illustrated in the accompanying drawings, attention being called to the fact, however, that the drawings are merely illustrative and that change may be made in the specific constructions illustrated and described, so long as the scope of the appended claims is not violated.

In the drawings:

FIG. 2 is a fragmentary, exploded perspective view showing the manner in which the hub of the constant speed V-pulley of FIG. 1 is drivingly connected to its axially movable disc;

FIG. 3 is a fragmentary sectional view showing an axially shiftable coned disc mounted on a hub, a spring for urging the coned disc axially inwardly, and a cartridge for the spring, one end of the spring being connected to the disc and the other end of the spring being connected to the hub so that the spring prevents significant relative rotation between the disc and the hub;

FIG. 4 is a fragmentary sectional view showing an embodiment of the present invention in which the spring cartridge serves to prevent relative rotation between the axially movable coned disc and the hub on which the disc is mounted;

FIG. 5 is an exploded, perspective view, showing a novel spring cartridge which serves to prevent relative rotation between the axially movable coned disc and the hub on which the disc is mounted;

FIG. 6 is a fragmentary elevational view, partially sectioned, showing how the lip segments of one member of the cartridge of FIG. 5 is received between and guided for axial movement by a keyway formed on the other member of the cartridge; and FIG. 7 is a sectional view showing the cartridge of FIG. 5 with an axially movable disc and the hub on which the disc is mounted.

Figure 1:
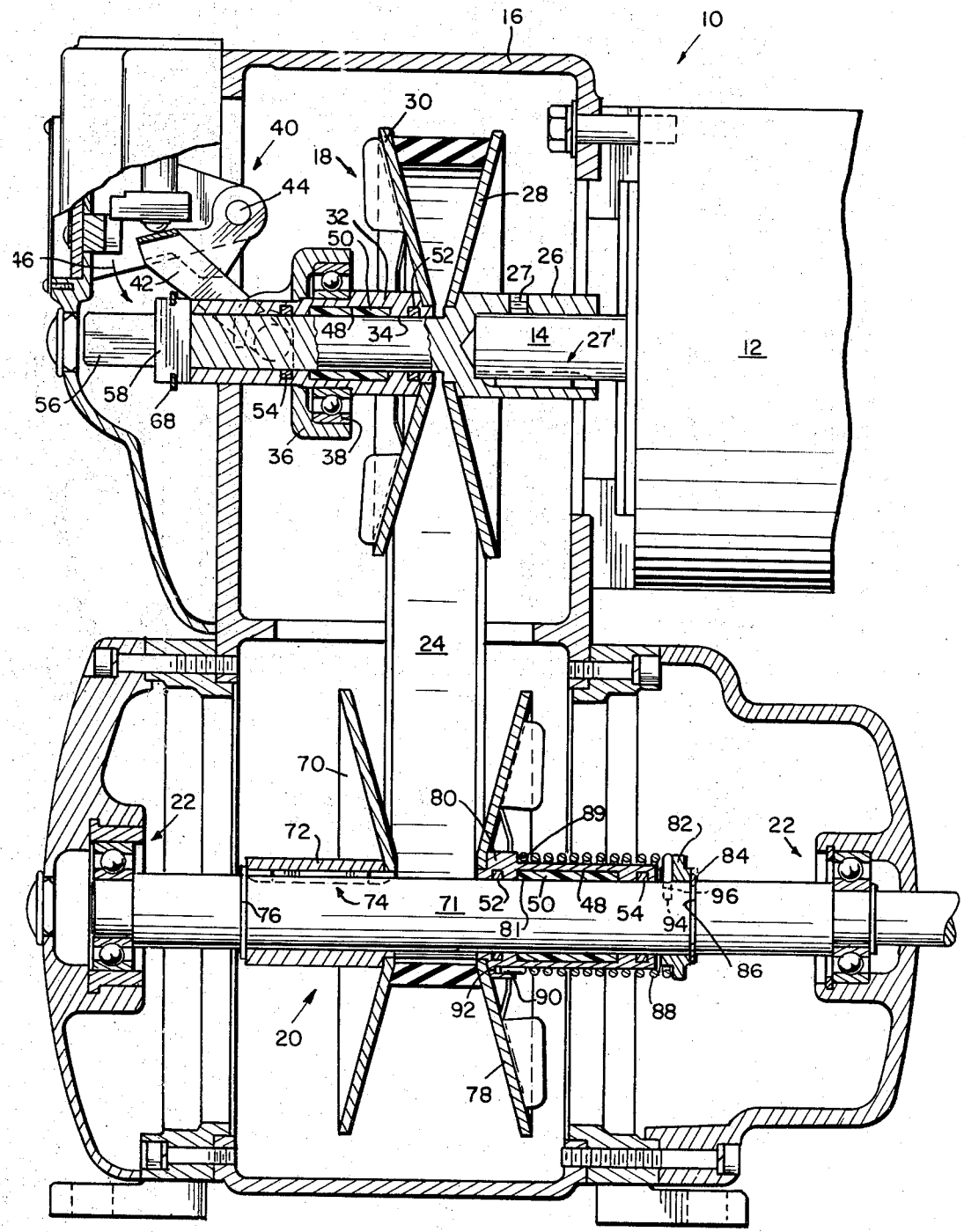
FIG. 1 is a fragmentary sectional view showing a variable speed drive system comprising expansible V-pulleys, each of which is lubricated by liquid lubricant.

Referring now to the drawings, and particularly to FIGS. 1 and 2, it will be seen that we have illustrated a variable speed drive system, indicated generally by the reference numeral 10, comprising a motor 12 having a conventional motor spindle 14, the motor being mounted on a casing 16 in which a constant speed expansible V-pulley 18 and a variable speed expansible V-pulley 20 are disposed. The variable speed V-pulley 20 is journal mounted in the casing 16 by bearings such as indicated by the reference numerals 22 and the constant speed V-pulley 18 is mounted on the spindle 14 for rotation therewith. A conventional belt 24 is trained about the pulleys 18, 20 to provide a driving connection therebetween.

The constant speed V-pulley 18 comprises a hub staft 26 which is mounted on the spindle 14 and secured thereto by conventional means such as the illustrated set screw 27 and the illustrated key arrangement 27'. A fixed coned disc 28 is welded or otherwise securely fastened fastened to the hub shaft 26 as illustrated. The hub shaft 26 is provided with an axially extending portion, i.e., a portion which extends axially to the left (FIG. 1) of the spindle 14, and the axially shiftable coned disc 30 of the pulley 18 is mounted on this portion. The coned disc 30 includes a sleeve portion 32 providing a bore 34 for telescopically receiving the hub shaft 26. Conventionally, we have provided a bearing housing 36 and thrust bearing 38 disposed about the sleeve portion 32 to provide means for axially shifting the coned disc 30 relative to the coned disc 28. Further, we have illustrated a conventional adjustment mechanism 40 for shifting axially the bearing housing 36, the mechanism 40 comprising a crank member 42 which is pivotally movable about the pin indicated at 44. When the crank member 42 is pivoted in the direction of the arrow 46, the bearing housing 36 and, consequently, the coned disc 30 are moved axially toward the fixed disc 28. When the crank member 42 moves in the direction opposite to the arrow 46, the coned disc 30 can move away from the coned disc 28. Thus, the effective radius of the coned discs 28, 30 depends on the position of the coned disc 30 relative to the coned disc 28. When the discs are relatively close together, the effective radius is relatively large and when the coned discs are separated, the effective radius is relatively small. The adjustment mechanism 40 and its structure is not a part of this invention and will not, therefore, be described in greater detail herein.

The bore 34 is formed with an axially and peripherally extending cutout 48 intermediate its ends and providing a reservoir which is substantially filled with a foam-like plastic sleeve 50 impregnated with a liquid lubricant. The sleeve 50, which peripherally contacts the hub shaft 26 continually wipes lubricant on the outer peripheral surface of the hub shaft. Sealing means 52, 54, which may be conventional O-rings, felt rings or neoprene rings received in internal grooves formed in the bore 34, are provided at opposite ends of the reservoir or cutout 48. These sealing means 52, 54 provide a seal between the sleeve portion 32 and the hub 26, thereby to prevent leakage or seepage of lubricant from the reservoir 48 onto the belt-engaging surfaces of the discs 28, 30. It will be appreciated that any lubricant which moves to the right (FIG. 1) past the sealing means 52 will, because of centrifugal forces resulting from the rotation of the pulley 18, flow radially outwardly onto the discs 28, 30. The fact that our reservoir 48 is filled with a foam-like sleeve 50 which is impregnated with lubricant tends to prevent such seepage or leakage past the sealing means 52, 54. That is, the liquid lubricant is contained in the interstices or pores of the foam-like sleeve. As stated previously, we prefer to use a polyurethane foam sleeve.

The left-hand end (FIG. 1) of the hub shaft 26 is provided with a diametrically and axially extending slot 56, the axially inner end of which terminates axially outwardly of the axially outermost sealing means 54. A key 58 extends diametrically through this slot, the key being connected to the sleeve 32 for reciprocation therewith. Specifically, as best seen in FIGS. 1 and 2, the end of the sleeve 32 is provided with a pair of diametrically oppositely disposed keyways 60, 62 receiving, respectively, the radially extending end portions of the key 58. In the illustrative embodiment, the sleeve portion 32 is provided with a peripherally extending groove 64 in its outer surface and intermediate the ends of the keyways 60, 62 and each radial end of the key 58 is provided with a groove 66 registering with the groove 64. An annulus 68, such as a conventional snap ring, is disposed in the grooves 64, 66 securely to fasten the key 58 to the sleeve 32. Thus, when the disc 30 reciprocates, the key 58 reciprocates in the slot 56. The key 58 serves to prevent relative rotation between the disc 30 and the hub 26.

We prefer that the key 58 be formed from aluminum and that it be covered with a tetrafluoroethylene-penetrated anodize coating. This anodize coating is highly lubricous and, of course, dry. The coating serves to prevent fretting corrosion between the key 58 and the slot 56 in which the key reciprocates.

It will be observed that the key 58 reciprocating in the slot 56 in no way interferes with or penetrates the boundary of the reservoir 48.

The variable speed V-pulley 20 comprises an axially fixed disc 70 mounted on a hub shaft 71 for rotation therewith, the fixed disc including a sleeve portion 72 receiving the hub shaft. The fixed disc 70 is prevented from rotating relative to the hub shaft 71 by means of the key arrangement indicated at 74 and is also prevented from moving axially to the left (FIG. 1) by a conventional snap ring 76 which is received in a groove in the hub shaft 71. An axially movable disc 78 is mounted on the hub shaft 71 to cooperate with the disc 70, this disc 78 having a sleeve portion 80 providing a bore 81 for telescopically receiving the hub shaft 71. This bore 81 is formed with a reservoir 48 into which a polyurethane foam sleeve 50 is inserted. This sleeve 50 is also impregnated with liquid lubricant as discussed in conjunction with the V-pulley 18. The bore 81 is also formed with grooves which receive sealing means 52, 54.

The axial movement of the disc 78 away from the fixed disc 70 is limited by an abutment 82 mounted on the hub shaft 71 and positioned by means of a snap ring 84 which is received in a groove 86 formed in the hub shaft 71 just to the right (FIG. 1) of the abutment 82. A coiled spring 88 is provided for yieldably urging the axially movable disc 78 toward the fixed disc 70, this spring being disposed between the abutment 82 and a shoulder 89 on the sleeve portion 80.

One end 90 of the spring 88 extends axially into a hole 92 in the shoulder 89 of the sleeve portion 80 and the opposite end 94 of the spring extends radially into an opening 96 in the hub shaft 71. In the illustrative embodiment, the spring end 94 also extends through an opening in the abutment 82. Thus, the spring 88 serves to prevent significant relative rotation between the axially movable disc 78 and the hub shaft 71. That is, one end of the spring 88 is connected to the disc 78 and the opposite end of the spring is connected to the hub shaft 71 to provide, through the coils of the spring, a driving connection between the disc and the hub.

The spring 88 conventionally urges the axially movable disc 78 toward the fixed disc 70 so that, when the axially movable disc 30 of the V-pulley 18 is moved away from the fixed disc 28, the spring will move the disc 78 axially inwardly toward the fixed disc 70 to cause the belt 24 to have a greater radius on the pulley 20. Conversely, when the disc 30 is moved by the mechanism 40 toward the disc 28, the spring 88 is compressed because the belt 24 is moved to have a greater effective radius on the pulley 18 and a correspondingly smaller effective radius on the pulley 20. Thus, the mechanism 40 must overcome the force of the spring 88.

Referring now to FIG. 3, another embodiment of our invention will be discussed. In FIG. 3, we have shown a portion of a hub shaft 100 on which a disc 102 is mounted for axial movement, the disc including a sleeve portion 104 providing a bore 106 for telescopically receiving the hub shaft 100. This bore 106 is also provided with a reservoir 48 in which a liquid-impregnated, foam-like sleeve 50 is disposed. Again, we have provided sealing means 52, 54 at opposite ends of the reservoir 48.

A spring 108 is provided for yieldably urging the disc 102 axially inwardly, i.e., to the left as viewed in FIG. 3, and a spring cartridge 110 is provided for containing the spring. The spring cartridge 110 has a structure which is disclosed in Lang Pat. 2,842,355 issued July 8, 1958. Thus, we refer to that patent for a more complete description of the cartridge 110. The cartridge 110 includes telescopically related tubular members 112, 114 and a fastening member 116. As described in the Lang patent, the tubular members 112, 114 are provided with cooperating lip means which prevent axial separation of the members by the spring 108. One end 118 of the spring 108 extends through an opening 120 in the fastening member 116 of the cartridge 110 and into an opening 122 in the sleeve portion 104 of the disc. The opposite end 124 of the spring 108 extends through an opening 126 in the tubular member 112 as illustrated. The tubular member 112 is prevented from rotating relative to the shaft 100 by means of a key 128 which is disposed in a keyway 129 formed in the tubular member 112 to be in registration with a keyway 130 formed in the hub shaft 100. The end 118 of the spring 108 extends through and into, respectively, the openings 120, 122 to prevent rotation of the tubular member 114 and the fastening member 116 relative to the disc 102. Thus, the disc 102 is drivingly connected to the hub shaft 100 through the coils of the spring 108.

Referring now to FIG. 4, still another embodiment of our invention will be discussed. In FIG. 4, we have shown a portion of the shaft 71 which is journal mounted in the casing 16 by means of bearings 22. A disc 142 is mounted on the shaft 71 for axial movement, the disc having a sleeve portion 144 providing a bore 146 for telescopically receiving the shaft 71. In accordance with our invention, this bore 146 is provided with a reservoir 48 which receives the foam-like sleeve 50 impregnated with a liquid lubricant and grooves which receive the sealing means 52, 54. A spring 148 is provided for yieldably urging the disc 142 axially inwardly, i.e., to the left as viewed in FIG. 4. We provide a spring cartridge 150 disposed concentrically about the shaft 71 to contain the spring 148, this spring cartridge comprising telescopically related tubular members 152, 154 as illustrated. The tubular member 154 is prevented from moving axially outwardly by the illustrated ring 156 which is received in a groove 158 formed in the shaft 71. The tubular member 154 is prevented from rotating relative to the shaft 71 by means of a key 160 which is disposed in a keyway 162 formed in the tubular member to be in registry with a keyway 164 formed in the shaft 71. The tubular member 152 is provided with a lug portion 166 which extends into an opening 168 in the sleeve portion 144 of the disc 142. This lug 166 prevents rotation of the tubular member 152 relative to the disc 142.

The tubular member 152 is provided with radially inwardly and peripherally extending lips 170 which cooperate with radially outwardly and peripherally extending lips 172 formed on the tubular member 154 to prevent axial separation of the tubular members by the spring 148. As illustrated, the tubular member 172 is provided with axially and radially inwardly extending flanges or lug portions 176 for engaging the lips 172 formed on the member 154 to prevent rotation of the member 154 relative to member 152. Specifically, the lug portions 176 define axially and peripherally extending keyways for receiving and guiding the lips 172. Thus, the disc 142 is drivingly connected to the shaft 71 by means of these keyways. The cartridge 150 may be similar to the cartridge 110 with the exception that the cooperating lip means are arranged as illustrated in FIG. 4 to prevent relative rotation of the cartridge members.

Referring now to FIGS. 5, 6 and 7, still a further embodiment of our invention will be discussed. In these figures, we have illustrated a spring cartridge 180 comprising a pair of tubular members 182, 184, each of which is formed with a partially closed end 186, 188 and an open end 190, 192. It will be appreciated that the partially closed ends 186, 188, respectively, of the members 182, 184 provide opposing end walls between which a coiled compression spring 194 is compressed.

The end wall 186 is provided with a centrally located bore 196 which receives the sleeve portion 198 of an axially movable disc 200 and that the end wall 188 is likewise provided with a centrally located bore 202 for receiving the hub shaft 204 on which the disc 200 is mounted. As discussed previously, the sleeve portion 198 provides a bore 206 for telescopically receiving the hub shaft 204, this bore 206 being formed with a reservoir 48 which is filled with a foam-like sleeve 50 impregnated with liquid lubricant. As discussed previously, sealing means 52, 54 is provided at each end of the reservoir 48.

The spring 194 urges the disc 200 axially inwardly, i.e., to the left as viewed in FIG. 7. The tubular member 184 is held against movement axially outwardly by a conventional snap ring 208 which is received in a groove 210 formed in the hub shaft 204. Further, the tubular member 184 is prevented from rotating relative to the hub shaft 204 by means of a key 212 which is disposed in a keyway 214 formed in the bore 202 to be in registry with a keyway 216 formed in the hub shaft 204. The tubular member 182 is provided with an axially extending lug portion 218 which is received in an opening 220 formed in the disc 200. The lug portion 218 prevents rotation of the tubular member 182 relative to the disc 200.

The members 182, 184 are, as illustrated, telescopically disposed with the open end 192 of the member 184 being inserted into the open end 190 of the member 182. Also, the axes of the members 182, 184 coincide generally with the axis of the hub shaft 204.

The member 182 is formed with radially inwardly and peripherally extending lip segments 222, 224 adjacent its open end 190, the lip segments 222, 224 being diametrically oppositely disposed about the periphery of the member. The member 184 is formed with radially outwardly and peripherally extending lip segments 226, 228, the lip segments 226, 228 being diametrically oppositely disposed about the periphery of the member 184. A lug portion 230, 232 extends axially toward the end wall 188 from each end of the lip segment 226 and a lug portion 234 extends axially toward the end wall 188 from each end of the lip segment 228, only one of the lug portons 234 being illustrated. The lug portions 230, 232 define an axially and peripherally extending keyway for receiving and guiding the lip segment 222 as best seen in FIG. 6. Similarly, the lug portions 234 extending axially from the lip segment 228 define a keyway for receiving and guiding the lip segment 224.

It will be appreciated that the peripheral spacing between the lug portion 230 and the lug portion 234 shown in FIG. 5 must be sufficient to permit the lip segment 222 to move axially therebetween and, similarly, the peripheral spacing between the lug portion 232 and the other lug portion 234 (not shown) must be sufficient to permit axial movement of the lip segment 224 therebetween. When the member 184 is inserted into the member 182, the segments 222, 224 move axially through the spaces, respectively, between the lug portions 230, 234 and 232, 234. After the member 184 is moved into the member 182 ot a point at which the lip segments 222, 224 are disposed axially to the right of the right-hand ends of the lug portions 230, 232, 234, and the member 184 is rotated approximately 90° about its axis, each lip segment 222, 224 will engage its associated lip segment 226, 228 to prevent axial separation of the members 182, 184 by the spring 194 compressed between the end walls 186, 188. Since the lip segment 222 is received between and guided for axial movement by the lug portions 230, 232 and since the lip segment 224 is similarly received between and guided for axial movement by the lug portions 234, the member 182 can move axially relative to the member 184 without rotating relative thereto throughout the axial extent of the lug portions. Once, of course, the member 182 moves axially outwardly, i.e., to the right as viewed in FIGS. 5, 6 and 7, to the point at which the lip segments 222, 224 are disposed axially to the right of the right-hand ends of the lug portions 230, 232, 234, the member 182 can then rotate relative to the member 184.

Thus, the lip segments 222, 224 and the lip segments 226, 228 are arranged so that, when the member 184 is rocked to one position about its axis relative to the member 182, the lip segments are cooperatively engaged to prevent axial separation of the members and, when the member 184 is rocked to a second position which, in the illustrative embodiment, is approximately 90° from the locking position, the members 182, 184 can be axially separated. Once the lip segments 222, 224 are cooperatively engaged, respectively, with the lip segments 226, 228, the two members cannot be separated until the spring 194 is compressed to the point at which the lip segments 222, 224 are disposed axially to the right of the right-hand ends of the lug portions 230, 232, 234.

Spring cartridge 180 is assembled by placing the spring 194 between the members 182, 184 and then, with a hydraulic ram or the like, inserting the member 184 into the member 182 and rotating the member 184 about its axis to achieve a locking relationship between the lip segments 222, 224 and the lip segments 226, 228 as discussed previously. After such a locking relationship is achieved, the spring 194 will urge the members 182, 184 in the opposite directions and, in use, will yieldably resist axial collapse of the cartridge 180.

The cartridge 180 is, therefore, a means for providing a driving connection between the disc 200 and the shaft 204. That is, once the lip segments 222, 224 are disposed, respectively, in the keyways defined by the lugs 230, 232 and 234, the disc 200 is drivingly connected through the lip segments 222, 224 and the keyways to the shaft 204.

We prefer that the tubular members 182, 184 be formed from aluminum and that the members be covered, at least in the area of mutual contact, with a tetrafluoroethylene-impregnated anodize coating. For instance, we prefer that at least the surfaces of the lip segments 222, 224 or the surfaces of the keyways defined by the lug portions 230, 232, 234 and including the outer peripheral surface of the member 184 in the keyways be covered with such an anodize coating. The purpose of the anodize coating is to prevent excessive frictional resistance to axial movement of the member 182 relative to the member 184.

It may be preferable simply to anodize completely the members 182, 184 to provide all surfaces thereof with the tetrafluoroethylene-impregnated anodize coating.

It will be appreciated that in each of the embodiments discussed above, there is provided a reservoir 48 containing foam-like material impregnated with liquid lubricant. In each of the embodiments there is provided means for drivingly connecting the axially movable disc to the hub shaft, i.e., means for preventing relative rotation between the axially movable disc and the hub shaft.

What is claimed is:

1. An expansible V-pulley comprising a hub, a coned disc axially movable on said hub, said coned disc having an axial bore for telescopically receiving said hub, said bore being formed with a peripherally and axially extending cutout intermediate its ends and providing a reservoir, means providing a seal between said disc and said hub at each end of said reservoir, porous means disposed in and substantially filling said reservoir, liquid lubricant impregnating said porous means, said coned disc including an axially extending sleeve portion providing said axial bore, the axially outer end portion of said hub being provided with an axially extending slot, the axially inner end of which terminates at a point axially outwardly of the axially outermost means providing a seal, and said sleeve portion being provided with an axially extending keyway registering with said slot, and including a key disposed in said keyway and arranged to extend into said slot, and means for securing said key to said sleeve portion for movement therewith relative to said hub, said key being effective to prevent relative rotation between said disc and said hub.

2. The invention of claim 1 in which said slot extends diametrically through said hub, in which said sleeve portion is provided with a second axially extending keyway disposed diametrically opposite to said first-mentioned keyway to register with said slot, and in which said key extends diametrically through said slot to have its end portions received, respectively, in said keyways.

3. The invention of claim 2 in which said keyways extend radially through said sleeve portion, in which said sleeve portion is formed with a peripherally extending groove in its outer surface and intermediate the ends of said keyways, in which each radial end of said key is provided with a groove registering with said first named groove, and in which said securing means includes an annulus disposed in said grooves.

4. The invention of claim 2 in which said key is a metal member coated with a solid, dry lubricous material effective to prevent fretting corrosion between said key and the walls of said slot.

5. An expansible V-pulley comprising a hub, a coned disc axially movable on said hub, said coned disc having an axial bore for telescopically receiving said hub, said bore being formed with a peripherally and axially extending cutout intermediate its ends and providing a reservoir, means providing a seal between said disc and said hub at each end of said reservoir, porous means disposed in and substantially filling said reservoir, liquid lubricant impregnating said porous means, a coiled compression spring for yieldably urging said disc axially inwardly along said hub, said spring being generally concentrically disposed about said hub and a spring cartridge generally concentrically disposed about said hub and enclosing said spring, said cartridge comprising a pair of tubular members, each member having a partially closed end and an open end, said members being telescopically and coaxially disposed with the partially closed ends defining the opposing end walls of said cartridge, one of said members providing peripherally and radially extending first lip means adjacent its open end and the other of said members providing peripherally and radially extending second lip means adjament its open end, said spring being compressed between the opposing end walls, said lip means being proportioned and designed so that, when said one member is rocked about its axis to one position relative to said other member, said lip means are cooperatively engaged to prevent axial separation of said members, thereby to hold said spring in compression, and when said one member is rocked about its axis to a second position relative to said other member, said lip means are disengaged to permit axial separation of said members by said spring, said first lip means including a first lip segment, said second lip means including a second lip segment having, at each of its ends, a lug portion extending axially toward the partially closed end of said other member, whereby, when said one member is in its said one position, said first lip segment is disposed between said lug portions, said lug portions defining an axially extending keyway for receiving and guiding said first lip segment and preventing movement of said one member from said one position without compression of said spring to move said first lip segment toward the partially closed end of said other member and beyond the axial extent of said lug portions, first means for connecting the axially inner member to said disc and second means for connecting the axially outer member to said hub, whereby said cartridge provides a driving connection between said disc and said hub with the permissible axial movement of said disc being determined by the axial length of the keyway defined by said lug portions.

6. The invention of claim 5 in which said hub is provided with an axially extending keyway, the axially inner end of which terminates at a point axially outwardly from the axially outermost means providing a seal between said disc and said hub, in which said axially outer member is provided with a registering keyway and in which said second means includes a key disposed in said keyways.

7. The invention of claim 5 in which said other members is coated, at least in the area of said lug portions and the keyway defined thereby, with a solid, dry lubricous material.

8. The invention of claim 5 in which said first lip segment is coated with a solid, dry lubricous material.

9. The invention of claim 5 in which said tubular members are formed from aluminum, and in which said other member is provided, at least in the area of said lug portions and the keyway defined thereby, with a tetrafluoroethylene-penetrated, anodize coating.

10. The invention of claim 5 in which said tubular members are formed from aluminum, and in which said first lip segment is provided, at least in the areas which engage said other member, with a tetrafluoroethylene-penetrated, anodized coating.

11. An expansible V-pulley comprising a hub, a coned disc axially movable on said hub, said coned disc including an axially extending sleeve portion providing an axial bore for telescopically receiving said hub, said hub being provided with an axially and diametrically extending slot, said sleeve portion being provided with a pair of diametrically oppositely disposed, axially extending keyways registering, respectively, with the radial edges of said slot, a key disposed in said keyways and arranged to extend diametrically through said slot, and means for securing said key to said sleeve portion for movement therewith relative to said hub, said key being effective to prevent relative rotation between said disc and said hub.

12. The invention of claim 11 in which said sleeve portion is provided with a peripherally extending groove in its outer surface and intermediate the ends of said keyways, in which each radial end of said key is provided with a groove registering with said first named groove, and in which said securing means includes an annulus disposed in said grooves.

13. A resiliently-expansible V-pulley comprising a hub, a coned disc axially movable on said hub, said coned disc including an axially extending sleeve portion providing an axial bore for telescopically receiving said hub, a coiled spring generally concentrically disposed about said hub and arranged yieldably to urge said coned disc axially inwardly, a spring cartridge generally concentrically disposed about said hub and enclosing said spring, said cartridge comprising a pair of tubular members, each member having a partially closed end and an open end, said members being telescopically and coaxially disposed with the partially closed ends defining the opposing end walls of said cartridge, one of said members providing peripherally and radially extending first lip means adjacent its open end and the other of said members providing peripherally and radially extending second lip means adjacent its open end, said spring being compressed between the opposing end walls, said lip means being proportioned and designed so that, when said one member is rocked about its axis to one position relative to said other member, said lip means are cooperatively engaged to prevent axial separation of said members, thereby to hold said spring in compression, and when said one member is rocked about its axis to a second position relative to said other member, said lip means are disengaged to permit axial separation of said members by said spring, said first lip means including a first lip segment, said second lip means including a second lip segment having, at each of its ends, a lug portion extending axially toward the partially closed end of said other member, whereby, when said one member is in its said one position, said first lip segment is disposed between said lug portions, said lug portions defining an axially extending keyway for receiving and guiding said first lip segment and preventing movement of said one member from said one position without compression of said spring to move said first lip segment toward the partially closed end of said other member and beyond the axial extent of said lug portions, first means for connecting the axially inner member to said disc and second means for connecting the axially outer member to said hub, whereby said cartridge provides a driving connection between said disc and said hub with the permissible axial movement of said disc being determined by the axial length of the keyway defined by said lug portions.

14. A resiliently-expansible V-pulley comprising a hub, a coned disc axially movable on said hub, said coned disc including an axially extending sleeve portion providing an axial bore for telescopically receiving said hub, a coiled spring generally concentrically disposed about said hub and arranged yieldably to urge said coned disc axially inwardly, a spring cartridge disposed about said hub and retaining said spring, said cartridge including a pair of telescopically related tubular members, each of said members being provided with peripherally extending lip means, said lip means cooperating to prevent axial separation of said members by said spring, said lip means on one of said members including a lip segment, said other member providing a pair of peripherally spaced apart and axially extending lug portions defining an axially extending keyway for receiving and guiding said lip segment, first means for connecting the axially inner member to said disc and second means for connecting the axially outer member to said hub, whereby said cartridge provides a driving connection between said disc and said hub and through said lip segment and keyway.

15. The invention of claim 14 in which said bore is formed with a peripherally and axially extending cutout intermediate its ends and providing a reservoir, means providing a seal between said disc and said hub at each end of said reservoir, porous means disposed in and substantially filling said reservoir, and liquid lubricant impregnating said porous means.

References Cited

UNITED STATES PATENTS

| | | | |
|---|---|---|---|
| 2,711,103 | 6/1955 | Miner | 74—230.17 |
| 2,842,355 | 7/1958 | Lang | 74—230.17UX |
| 2,952,161 | 9/1960 | Williams | 74—230.17 |
| 3,138,032 | 6/1964 | Raso | 74—230.17 |
| 3,318,166 | 5/1967 | Anderson | 74—230.17 |
| 3,400,600 | 9/1968 | Ruprecht | 74—230.17 |

JAMES A. WONG, Primary Examiner

U.S. Cl. X.R.

184—5; 308—238, 240